United States Patent
Wang

(10) Patent No.: US 9,811,406 B2
(45) Date of Patent: Nov. 7, 2017

(54) METHOD AND SYSTEM FOR PRESENTING FAULT PROBLEMS IN A COMPUTER, AND STORAGE MEDIUM THEREOF

(71) Applicant: TENCENT TECHNOLOGY (SHENZHEN) COMPANY LIMITED, Guangdong (CN)

(72) Inventor: Zhihua Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 396 days.

(21) Appl. No.: 14/567,081

(22) Filed: Dec. 11, 2014

(65) Prior Publication Data

US 2015/0100836 A1 Apr. 9, 2015

Related U.S. Application Data

(63) Continuation of application No. PCT/CN2013/077756, filed on Jun. 24, 2013.

(30) Foreign Application Priority Data

Jun. 28, 2012 (CN) .......................... 2012 1 0217471

(51) Int. Cl.
*G06F 11/00* (2006.01)
*G06F 11/07* (2006.01)
(Continued)

(52) U.S. Cl.
CPC ...... *G06F 11/0769* (2013.01); *G06F 11/0706* (2013.01); *G06F 11/079* (2013.01); *G06F 11/327* (2013.01); *G06F 21/554* (2013.01)

(58) Field of Classification Search
CPC ................................................ G06F 11/0769
See application file for complete search history.

(56) References Cited

U.S. PATENT DOCUMENTS 6,147,617 A * 11/2000 Kim ...................... G09G 3/006
324/556
6,662,221 B1 * 12/2003 Gonda ................ H04L 12/2697
370/254

(Continued)

FOREIGN PATENT DOCUMENTS

| CN | 101533365 | 9/2009 |
| CN | 102439568 | 5/2012 |
| CN | 102799513 | 11/2012 |

OTHER PUBLICATIONS

International Search Report, PCT/CN2013/077756, Tencent Technology (Shenzhen) Company Limited, dated Sep. 26, 2013.

(Continued)

*Primary Examiner* — Christopher McCarthy
(74) *Attorney, Agent, or Firm* — Anova Law Group, PLLC

(57) ABSTRACT

The present invention relates to a method for displaying fault problems. The method comprises: detecting a computer, to find fault problems of the computer among fault problems supported by a computer fault diagnosing and treating program; sorting the fault problems supported by the computer fault diagnosing and treating program, wherein the detected fault problems of the computer are preferentially sorted; and sequentially displaying the fault problems supported by the computer fault diagnosing and treating program. The present invention also provides a corresponding system for displaying fault problems. By means of the method and the system for displaying fault problems according to the present invention, the fault problems most expected to be solved can be easily and quickly found in display result.

16 Claims, 2 Drawing Sheets

(51) Int. Cl.
*G06F 11/32* (2006.01)
*G06F 21/55* (2013.01)

(56) References Cited

U.S. PATENT DOCUMENTS

| | | | | |
|---|---|---|---|---|
| 7,200,774 B2* | 4/2007 | Vollmar | ............ | G05B 23/0278 714/26 |
| 2004/0205717 A1* | 10/2004 | Chiang | ................ | G06F 11/362 717/124 |
| 2009/0158079 A1* | 6/2009 | Chung | ............... | G05B 23/0264 714/2 |
| 2010/0082708 A1* | 4/2010 | Kim | ....................... | G06Q 10/06 707/812 |
| 2015/0113311 A1* | 4/2015 | Nakanishi | ........... | G06F 11/2028 714/3 |
| 2015/0227870 A1* | 8/2015 | Noboa | ............... | G06Q 10/0635 705/7.28 |
| 2015/0302319 A1* | 10/2015 | Elder | ................. | G06Q 10/0831 700/291 |
| 2017/0017566 A1* | 1/2017 | Lundstrom | ......... | G06F 11/3684 |

OTHER PUBLICATIONS

Patent Abstract of CN101533365, Computer System, Maintenance Method and Device Thereof, Tang Jun, Sep. 16, 2009.
Patent Abstract of CN102439568, System Health and Performance Care of Computing Devices, Sony Corp. and Sony Electronics Inc., May 2, 2012.
Patent Abstract of CN102799513, Method and System for Displaying Fault Problems, Tencent Technology (Shenzhen) Co., Ltd., Nov. 28, 2012.

* cited by examiner

METHOD AND SYSTEM FOR PRESENTING FAULT PROBLEMS IN A COMPUTER, AND STORAGE MEDIUM THEREOF

CROSS REFERENCE TO RELATED APPLICATIONS

This application is a continuation application of PCT application No. PCT/CN2013/077756, filed on Jun. 24, 2013 which claims priority to a Chinese patent application. No. 201210217471.9 filed on Jun. 28, 2012, disclosures of both of which are incorporated herein by reference in their entireties.

TECHNICAL FIELD

The subject matter disclosed herein relates to the field of computer technologies, and in particular to a method and system for presenting fault problems by a computer fault diagnosing and treating program, and a storage medium.

TECHNICAL BACKGROUND

With the progress of sciences and technologies, computers have become a necessary tool for people's daily lives and work. However, families may not have a skilled computer operator to maintain their computer well. When a fault occurs to the computer, it is very inconvenient or expensive to take the computer to a repair center for repairing. In most cases, the fault of the computer is so minor and can be solved by the user to recover the computer from the fault if a hint is provided for the user, or can be solved by the user who performs operations step by step by following hints to remove the fault.

Currently, a computer fault diagnosing and treating program developed in the industries can be configured to present common problems of computer, from which the computer problem encountered by the user may be selected and clicked by a user, so that the computer fault diagnosing and treating program can automatically execute the corresponding solution to solve the computer problem selected by the user.

Currently, popular computer fault diagnosing and treating programs available in the market include a computer clinic of a Tencent™ computer manager and a computer clinic of a 360™ security guard, both of which can present the common fault problems in the computer, and further provide corresponding solutions for solving the fault problems.

Besides, either of the above software programs can present the common fault problems of computer in such a manner that the common fault problems are generally sorted according to popularity levels thereof and are sequentially presented to the user. For example, the computer clinic of the 360™ security guard presents the common fault problems of computer to the user according to the popularity levels thereof within an category of common problems, in order for selecting by the user, while the computer clinic of the Tencent™ computer manager presents the common fault problems of computer to the user according to the popularity levels thereof in a computer clinic homepage, in order for selecting by the user.

In addition, both of the above software programs further classify the common fault problems. For example, the computer clinic of the 360™ security guard classifies the presented common fault problems into six categories, i.e. networking abnormality, system icon problems, system performance problems, game environment problems, common software problems, and synthetic problems; while the computer clinic of the Tencent™ computer manager classifies the presented common fault problems into four categories, i.e. desktop icon problems, networking abnormality, software problems, and system synthetic problems. Despite of the above different classification methods and details, both of the above two software programs classify the presented common fault problems of computer.

Moreover, both of the above software programs may detect basic configuration. information of the computer such as an operating system version and a browser version, and determine according to the basis configuration information of the computer whether a certain fault problem is possible for this computer; if the certain fault problem is not possible for the computer, then certain fault problem will not be presented by the above software programs on the computer. Furthermore, both of the above two software programs sequentially present the fault problems of computer in each category according to the popularity levels of the fault problems, to allow the user to select the fault problem encountered by the user from the presented fault problems of computer. Besides, both of the above software programs further provide a searching function, which may be used by the user for searching by inputting keywords to found the fault problem encountered by the user.

However, both of the above software programs have distinct defects in use. For example, when a fault problem occurs to a computer of a user, the user may spend too much time on searching for the fault problem encountered by the user, and even possibly give up the search due to the too much time taken for the search, because both of the software programs present the fault problems of computer according to the popularity levels thereof, but the popularity levels are generally derived from the amount of feedbacks of users in forums or other channels and it cannot be concluded that a fault problem occurring to computers of numerous users must exist in the computer of this user.

Additionally, although the searching function provided by both of the software programs can overcome the above defects in some extent, it is very demanding for the user using the searching function. For example, the user is preliminarily required to be able to type words on the computer, and further to be able to clearly identity the fault problem as encountered and extract associated keywords. Such demands are rather high and hence not extensively acceptable for ordinary users.

Additionally, a system repairing software of the 360™ security guard and a Trojan quick scanning software of the Tencent™ computer manager also have a certain computer fault diagnosing and treating capability, and, after starting, can automatically detect faults and problems existing in the computer, and then sort and present the detected faults and problems according to risk levels. However, both of the system repairing software and the Trojan quick scanning software can only process faults and problems readily detectable in a certain computer, other than any fault or problem which is undetectable or inconveniently detectable.

SUMMARY OF THE INVENTION a method and system for presenting fault problems is provided, to allow a user to easily and quickly find a fault problem expected to be solved.

An aspect of the present invention provides a method for presenting fault problems, including: detecting a computer to detect a fault problem existing in the computer which is among fault problems supported by a computer fault diagnosing and treating program; sorting the fault problems supported by the computer fault diagnosing and treating program, wherein, the detected fault problem existing in the computer is sorted preferentially; and sequentially presenting the sorted fault problems supported by the computer fault diagnosing and treating program.

Another aspect of the present invention further provides a system for presenting fault problems, including: a detection module, a sorting module, and a presentation module. The detection module configured for detecting a computer to detect a fault problem existing in the computer which is among fault problems supported by a computer fault diagnosing and treating program. The sorting module configured for sorting the fault problems supported by the computer fault diagnosing and treating program, wherein, the detected fault problem existing in the computer is sorted preferentially. The presentation module configured for sequentially presenting the sorted fault problems supported by the computer fault diagnosing and treating program.

Additionally, an embodiment of the present invention further provides one storage medium including computer executable instructions, where, the computer executable instructions are configured for executing a method for presenting fault problems, and the method includes: detecting a computer to detect a fault problem existing in the computer which is among fault problems supported by a computer fault diagnosing and treating program; sorting the fault problems supported by the computer fault diagnosing and treating program, wherein, the detected fault problem existing in the computer is sorted preferentially; and sequentially presenting the sorted fault problems supported by the computer fault diagnosing and treating program.

In the method and system for presenting the fault problems and storage medium according to the aspects above, first the computer can be detected to detect the fault problem present therein, and then the detected fault problem existing in the computer can be sorted and presented preferentially in the processes of sorting and presenting, so the users can easily and quickly find the fault problem most expected to be solved by themselves in the presentation result. Additionally, in the invention, the undetectable or inconveniently detectable fault problems are further presented, and hence are processed correspondingly.

The above illustration is merely a summary of the technical solutions of the present disclosure, and in order to make the technical means of the present disclosure more clear, the technical means of the present disclosure can be practiced according to the description, and in order to make the above and other objects, features and advantages more apparent, the preferable embodiments are illustrated below in combination with accompanying drawings. Details of the illustration are set forth below.

DESCRIPTION OF DRAWINGS

Accompanying drawings used for the description of embodiments of the invention are briefly introduced below in order to illustrate the technical solutions in the embodiments of the present invention more clearly. Apparently, the drawings for the following description are merely relative to some embodiments of the invention, and other drawings can be obtained. according to these drawings by those skilled in the art without any creative work.

DETAILED DESCRIPTION OF THE PREFERRED EMBODIMENT

Technical solutions in embodiments of the invention are described. clearly and fully below in conjunction with the accompanying drawings for the embodiments of the present invention. Apparently, the embodiments described herein are merely a part but not all of the embodiments of the invention. All other embodiments obtained by those skilled in the art in light of the described embodiments of the invention without any creative work pertain to the protection scope of the invention.

Embodiments of the invention are further described in detail below in conjunction with the accompanying drawings.

Figure 1:
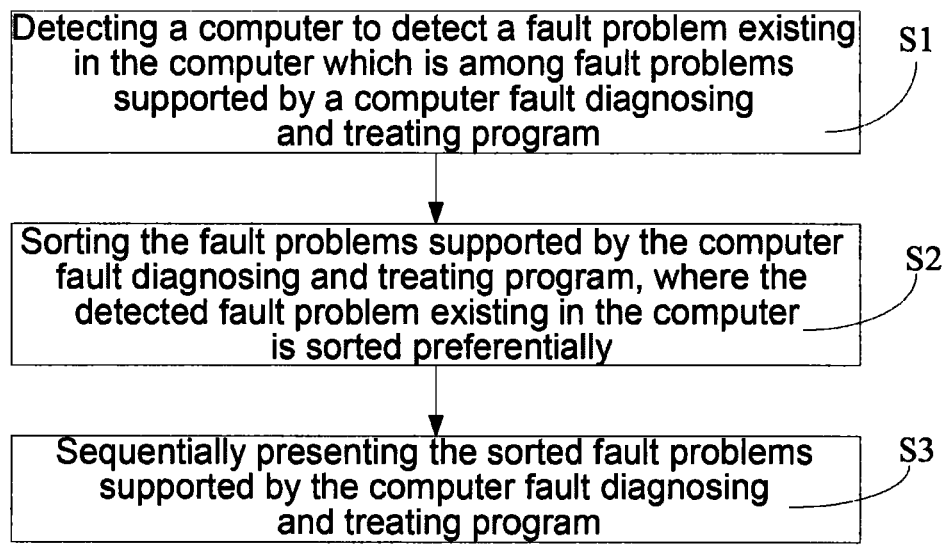
FIG. 1 is a flowchart showing a method for presenting computer fault problems according to an embodiment of the invention.

FIG. 1 is a flowchart showing a method for presenting fault problems according to an embodiment of the invention. The method for presenting fault problems according to an embodiment of the invention can be adopted in a computer fault diagnosing and treating program such as a computer clinic of 360™ security guard and a computer clinic of Tencent™ computer manager. As shown in FIG. 1, the method for presenting computer fault problems according to an embodiment of the invention includes Steps S1 to S3 below.

Step S1: detecting a computer to detect a fault problem existing in the computer which is among fault problems supported by a computer fault diagnosing and treating program.

The computer fault problems supported by the computer fault diagnosing and treating program include readily detectable fault problems as well as undetectable or inconveniently detectable fault problems. The readily detectable fault problems refer to problems which are detectable when the computer fault diagnosing and treating program detects the computer. Among the fault problems supported by the computer fault diagnosing and treating program, there is also a type of fault problems, which is undetectable or is detectable through complicated detection technologies or requires for too much detection time, and may be possibly detected only when a software or a function with the type of fault problems is executed actually, and thus the type of fault problems is defined as undetectable or inconveniently detectable fault problems.

In the invention, a set of all the fault problems supported by the computer fault diagnosing and treating program may be defined as a set ALL_SET; a set of undetectable or inconveniently detectable fault problems may be defined as a set INCAPABLE_SET and a set of readily detectable fault problems may be defined as a set CANSCAN_SET.

In the invention, when started in a specific computer, the computer fault diagnosing and treating program can detect the specific computer to detect a fault problem existing in the specific computer which is among the computer fault problems supported by the computer fault diagnosing and treating program.

The detected fault problem existing in the specific computer may be an affirmed fault problem or a suspicious fault problem.

Specifically, in the fault problems existing in the selected specific computer, some of the fault problems are caused by intentional or unintentional destruction made by a Trojan virus, software and so on, and hereby can be defined as affirmed fault problems; and some others of the fault problems are caused because users themselves change system settings but do not know how to restore the system settings, and hereby can be defined as suspicious fault problems.

For example, if the fault problem is caused by a software damage which results in automatic reboot of the computer after the computer is shut down, the fault problem is an affirmed fault problem since generally no user wishes the computer cannot be to shut down, i.e., such fault problem existing in the computer is undesired by the user, and is caused by a damage in the computer.

If the fault problem involves in the disappearance of a task manager menu bar, such fault problem is a suspicious fault problem, because the disappearance of the task manager menu bar is also a feature of a Windows operating system, that is, when a user double-clicks a mouse at blank areas of the task manager, the task manager menu bar will disappear, and when the user again double-clicks a mouse at the blank areas of the task manager, the task manager menu bar appears again. That is, such fault problem may result from either an initiative operation of the user or intentional or unintentional destruction made by the Trojan virus or other software to the settings of the computer operating system.

Here, a set of affirmed fault problems among the detected fault problems existing in the specific computer may be defined as a set SURE_SET, and a set of suspicious fault problems among the detected fault problems existing in the specific computer may be defined as a set MAYBE_SET.

Figure 2:
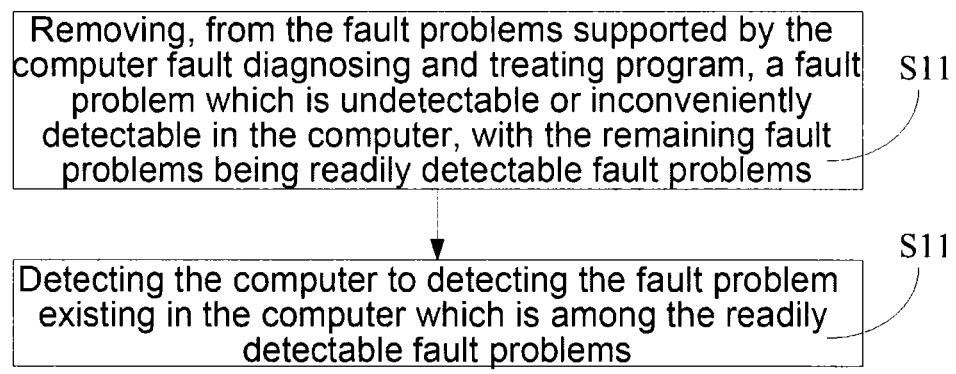
FIG. 2 is a specific flowchart showing Step Si shown in FIGS. 1.

FIG. 2 is a specific flowchart showing Step S1. As shown in FIG. 2, in the invention, since the detected fault problems existing in the specific computer can only be selected from the set CANSCAN_SET of readily detectable fault problems which are among the fault problems supported by the computer fault diagnosing and treating program, Step S1 can further include Steps S11 to S12 below.

Step S11: removing, from the fault problems supported by the computer fault diagnosing and treating program, a fault problem which is undetectable or inconveniently detectable in the computer, with the remaining fault problems in the fault problems supported by the computer fault diagnosing and treating program being readily detectable fault problems; and Step S12: detecting the computer to detecting the fault problem existing in the computer which is among the readily detectable fault problems.

In other words, the affirmed fault problems and the suspicious fault problems both of which are among the detected fault problems existing in the computer are selected from the set CANSCAN_SET of readily detectable fault problems, thereby forming the set SURE_SET of affirmed fault problems and the set MAYBE_SET of suspicious fault problems, respectively.

Since the detected fault problem existing in the computer must not be selected from those undetectable or inconveniently detectable fault problems which are among the fault problems supported by the computer fault diagnosing and treating program, but from the set CANSCAN SET of readily detectable fault problems, it can be configured in the invention that the fault problem existing in the specific computer is directly selected from the set CANSCAN SET of readily detectable fault problems.

Step S2: sorting the fault problems supported by the computer fault diagnosing and treating program, where the detected fault problem existing in the computer is sorted preferentially.

In the invention, the detected fault problem existing in a specific computer is closely associated with the specific computer, and hence .might be a fault problem most expected to be solved by the user who operates the specific computer, thus the detected fault problem existing in the computer is sorted preferentially when the fault problems are sorted.

Further, the affirmed fault problem (i.e., the fault problem in the set SURE_SET) which is among the detected fault problems existing in the computer is more likely the fault problem most expected to be solved by the user who operates the specific computer, compared with the suspicious fault problem (i.e., the fault problem in the set MAYBE_SET), thus, when the detected fault problems existing in the computer are sorted, it can be configured that the affirmed fault problem is sorted more preferentially than the suspicious fault problem.

Then, after the affirmed fault problem and the suspicious fault problem which are among the selected fault problems existing in the computer are sorted, other fault problems such as the undetectable or inconveniently detectable fault problems (i.e., the fault problems in the :INCAPABLE STE set) are sorted.

Additionally, in sorting the affirmed fault problems (i.e., fault problems in the set SURE_SET), the suspicious fault problems (i.e., fault problems of the set MAYBE_SET) or the undetectable or inconveniently detectable computer fault problems (i.e., computer fault problems in the set INCAPABLE_SET), each fault problem therein can further be sorted. according to a popularity level of the fault problem, that is, in sorting the sets of fault problems, a fault problem with a higher popularity level within each of the sets is more preferentially sorted.

The popularity level of a fault problem may come from the amount of feedbacks for the fault problem by users in forums or other channels in order to reflect a concern level of the users for the fault problem, and may be determined from the amount of search results for the fault problem, or search times for the fault problem, or sources of search results for the fault problem (for example whether it comes from important and famous websites) and so on. The greater the number of users interested on such fault problem, the higher the popularity level of the fault problem is, i.e., indicating that the probability of occurrence the fault problem is higher, the more likely the fault problem is the one expected to be solve by the user. Therefore, in sorting, the fault problems with higher popularity levels can be sorted preferentially.

It can be understood by those skilled in the art that, considering that the fault problem. existing in the computer has been detected among the readily detectable fault problems (i.e. fault problems in the set CANSCAN_SET) in Step SI, other readily detectable fault problems are not existing in the specific computer, i.e. other readily detectable fault problems are not concerned by the user who operates the specific computer. Thus, in sorting, these other readily detectable fault problems need not be sorted.

Therefore, it can be configured in the invention that the affirmed fault problems (i.e., the fault problems in the set SURE_SET) are sorted preferentially, and then the suspicious fault problems (i.e., the fault problems in the set MAYBE_SET) are sorted, and finally the undetectable or inconveniently detectable fault problems (i.e., the fault problems in the set INCAPABLE_SET) are sorted. However, if a certain set of fault problems (i.e., the set SURE SET, the set MAYBE_SET, or the set INCAPABLE_SET) described above is not present, then the set of fault problems can be ignored, and the next set of fault problems is sorted sequentially. Additionally, the fault problem in each set of fault problems can further be sorted according to a popularity level thereof.

Step S3: sequentially presenting the sorted fault problems supported by the computer fault diagnosing and treating program.

Here, the fault problems can be presented to the user sequentially based on the sorting result of the fault problems from. Step S2 described above.

Therefore, in the method for presenting the fault problems according to the invention, firstly the computer can be detected to detect the fault problem existing in the computer, and the detected fault problem existing in the computer can be sorted and presented preferentially in the processes of sorting and presenting, so that the users can easily and quickly find the fault problem expected to be solved by themselves in the presented result.

Additionally, it can be understood by those skilled in the art that in sorting and presenting the fault problems, the computer fault diagnosing and treating program has two present patterns, i.e. a homepage present pattern and a classified present pattern.

In the case of the homepage present pattern, the fault problems can be sorted and presented based on the method. for presenting the computer fault problems according to the invention, and when the homepage is full with the fault problems, the remaining fault problems are not sorted and presented.

In the case of the classified present pattern, in each type oldie fault problems such as the type of networking abnormality, the type of system icon problems, the type of system performance problems, the type of game environment problems, the type of common software problems and the type of synthetic problems in the computer clinic of the 360™ security guard, or the type of desktop icon problems, the type of networking abnormality, the type of software problems and the type of system synthetic problems in the computer clinic of the Tencent™ computer manager, the computer fault problems can be sorted and presented according to the method for presenting the fault problems of the invention. Besides, a plurality of pages are provided in the classified present pattern, that is, when the homepage is full with the fault problems, the remaining fault problems may be sorted and presented on the second page, and so on.

Figure 3:
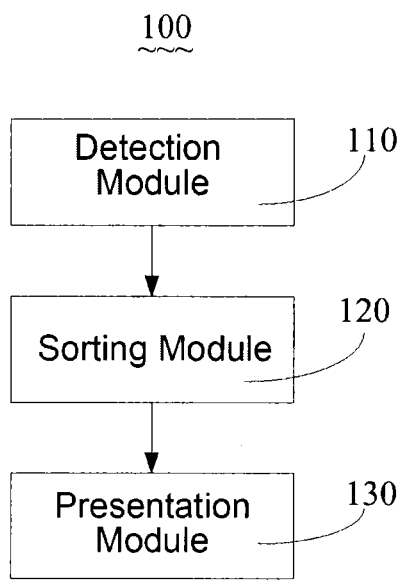
FIG. 3 is a schematic diagram showing a system for presenting computer fault problems according to an embodiment of the invention.

The invention further provides a system for presenting the fault problems. FIG. 3 is a schematic diagram showing a system for presenting the computer fault problems according to an embodiment of the invention. As shown in FIG. 3, the system for presenting the fault problems according to the embodiment of the invention 100 includes a detection module 110, a sorting module 120 and a presentation module 130. The detection module 110 is configured. for detecting a computer to detect a fault problem existing in the computer which is among fault problems supported by a computer fault diagnosing and treating program. The sorting module 120 is configured for sorting the fault problems supported by the computer fault diagnosing and treating program, where the detected fault problem existing in the computer is sorted preferentially. The presentation module 130 is configured for sequentially presenting the sorted fault problems supported by the computer fault diagnosing and treating program.

In detecting the computer, the detection module 110 detects the fault problem existing in the computer which is among the readily detectable fault problems.

The detected fault problem existing in the computer includes an affirmed fault problem and a suspicious fault problem, and in sorting the fault problems, the sorting module 120 sorts the affirmed fault problem more preferentially than the suspicious fault problem, and in additional, as for the affirmed fault problems or the suspicious fault problems, they can be further sorted according to popularity levels thereof. The sorting module 120 and the presentation module 130 may not sort and present the fault problems among the readily detectable fault problems except for the detected fault problem existing in the computer.

In summary, in the method and system for presenting the fault problems according to the invention, firstly the computer can be detected to detect the fault problem existing therein, and then the detected fault problem existing in the computer can be sorted and presented preferentially in the processes of sorting and presenting, so that the users can easily and quickly find the fault problem most expected to be solved by themselves in the presentation result. Additionally, in the invention, the undetectable or inconveniently detectable fault problems are further presented, and hence are processed correspondingly.

It can be understood by those skilled in the art that all or a part of steps for achieving the above embodiments can be implemented through hardware, and can also be implemented through instructing the related hardware by programs which can be stored in a computer readable storage medium, and the above-mentioned storage medium can be a read-only memory, a magnetic disk or an optical disk and so on.

The preferred embodiments of the present invention are described as above, but not intended to limit the present invention. Within the spirit and principle of the present invention, changes, substitutions conceived by any one of those skilled in the art within the disclosed technical scope of the invention should fall into the scope of protection of the present invention, thus the scope of the invention should be indicated by the appended claims.

The invention claimed is:

1. A method for presenting fault problems, comprising:
automatically determining, among a list of fault problems supported by a computer fault diagnosing and treating program, whether a first fault problem belonging to an inconveniently detectable fault problem list exists, wherein the inconveniently detectable fault problem list includes at least a problem detectable only when a corresponding software or a corresponding function is executed;
in response to determining that the first fault problem exists, removing, from the list of fault problems, the first fault problem, wherein fault problems remaining in the list are readily detectable fault problems;
scanning a computer to detect whether one or more second fault problems among the readily detectable fault problems supported by the computer fault diagnosing and treating program exists in the computer;
sorting the fault problems supported by the computer fault diagnosing and treating program, wherein, the detected one or more second fault problems existing in the computer is sorted preferentially; and
sequentially presenting the sorted fault problems supported by the computer fault diagnosing and treating program.

2. The method of claim 1, wherein, the detected one or more second fault problems existing in the computer comprises an affirmed fault problem and a suspicious fault problem.

3. The method of claim 2, wherein, in sorting the fault problems supported by the computer fault diagnosing and treating program, the affirmed fault problem is sorted more preferentially than the suspicious fault problem.

4. The method of claim 3, wherein, the affirmed fault problems are further sorted according to popularity levels, and when presenting the sorted problems, the affirmed fault problem with a higher popularity level is presented preferentially.

5. The method of claim 3, wherein, the suspicious fault problems are further sorted according to popularity levels, and when presenting the sorted problems, the suspicious fault problem with a higher popularity level is presented preferentially.

6. The method of claim 3, wherein the readily detectable fault problems, except for the detected one or more second fault problems existing in the computer, are not sorted.

7. The method of claim 2, wherein
the affirmed fault problem includes a fault problem caused by destruction made by a virus or a software; and
a suspicious fault problem includes a problem caused by changing a system setting.

8. A system for presenting fault problems, comprising:
a detection module configured for:
automatically determining, among a list of fault problems supported by a computer fault diagnosing and treating program, whether a first fault problem belonging to an inconveniently detectable fault problem list exists, wherein the inconveniently detectable fault problem list includes at least a problem detectable only when a corresponding software or a corresponding function is executed;
in response to determining that the first fault problem exists, removing, from the list of fault problems, the first fault problem, wherein fault problems remaining in the list are readily detectable fault problems; and
scanning a computer to detect whether one or more second fault problems among the readily detectable fault problems supported by the computer fault diagnosing and treating program exists in the computer;
a sorting module configured for sorting the fault problems supported by the computer fault diagnosing and treating program, wherein, the detected one or more second fault problems existing in the computer is sorted preferentially; and
a presentation module configured for sequentially presenting the sorted fault problems supported by the computer fault diagnosing and treating program.

9. The system of claim 8, wherein, the detected one or more second fault problems existing in the computer comprise an affirmed fault problem and a suspicious fault problem.

10. The system of claim 9, wherein, in sorting the fault problems supported by the computer fault diagnosing and treating program, the sorting module is configured to sort the affirmed fault problem more preferentially than the suspicious fault problem.

11. The present system of claim 10, wherein, in sorting the affirmed fault problem, the sorting module is configured to further sort the affirmed fault problems according to popularity levels of the affirmed fault problems.

12. The present system of claim 10, wherein, in sorting the suspicious fault problem, the sorting module is configured to further sort the suspicious fault problems according to popularity levels of the suspicious fault problems.

13. The present system of claim 10, wherein the sorting module does not sort fault problems among the readily detectable fault problems except for the detected one or more second fault problems existing in the computer.

14. A non-transitory storage medium comprising computer executable instructions, wherein the computer executable instructions are configured for executing a method for presenting fault problems, and the method comprises:
automatically determining, among a list of fault problems supported by a computer fault diagnosing and treating program, whether a first fault problem belonging to an inconveniently detectable fault problem list exists, wherein the inconveniently detectable fault problem list includes at least a problem detectable only when a corresponding software or a corresponding function is executed;
in response to determining that the first fault problem exists, removing, from the list of fault problems, the first fault problem, wherein fault problems remaining in the list are readily detectable fault problems;
scanning a computer to detect whether one or more second fault problems among the readily detectable fault problems supported by the computer fault diagnosing and treating program exists in the computer;
sorting the fault problems supported by the computer fault diagnosing and treating program, wherein, the one or more second fault problems existing in the computer is sorted preferentially; and
sequentially presenting the sorted fault problems supported by the computer fault diagnosing and treating program.

15. The non-transitory storage medium of claim 14, wherein
the detected one or more second fault problems existing in the computer comprises an affirmed fault problem and a suspicious fault problem.

16. The storage media storage medium of claim 14, wherein
the readily detectable fault problems, except for the detected one or more second fault problems, existing in the computer, are not sorted.

\* \* \* \* \*